(12) United States Patent
Manetakis et al.

(10) Patent No.: US 12,489,474 B2
(45) Date of Patent: Dec. 2, 2025

(54) RF TRANSCEIVER

(71) Applicant: CSEM Centre Suisse d'Electronique et de Microtechnique SA—Recherche et Développement, Neuchâtel (CH)

(72) Inventors: Konstantinos Manetakis, Neuchâtel (CH); Anjana Dissanayake, Neuchâtel (CH)

(73) Assignee: CSEM Centre Suisse d'Electronique et de Microtechnique SA—Recherche et Développement, Neuchâtel (CH)

( * ) Notice: Subject to any disclaimer, the term of this patent is extended or adjusted under 35 U.S.C. 154(b) by 303 days.

(21) Appl. No.: 18/346,665

(22) Filed: Jul. 3, 2023

(65) Prior Publication Data

US 2024/0014835 A1    Jan. 11, 2024

(30) Foreign Application Priority Data

Jul. 5, 2022   (EP) ..................................... 22183057
Jul. 22, 2022  (EP) ..................................... 22186485

(51) Int. Cl.
*H04B 1/40*   (2015.01)
*H04B 1/00*   (2006.01)
*H04B 1/04*   (2006.01)
*H04B 1/44*   (2006.01)

(52) U.S. Cl.
CPC ............ *H04B 1/04* (2013.01); *H04B 1/0078* (2013.01); *H04B 2001/0408* (2013.01); *H04B 1/44* (2013.01)

(58) Field of Classification Search
CPC ................... H04B 1/04; H04B 1/0078; H04B 2001/0408; H04B 1/0458; H04B 1/401; H04B 1/581; H04B 1/48; H04B 1/40; H04B 1/44; H03F 1/26; H03F 3/195; H03F 3/217; H03K 17/687; H03K 17/081; H03K 17/002

See application file for complete search history.

(56) References Cited

U.S. PATENT DOCUMENTS

| 8,044,540 B2 * | 10/2011 | Lee et al. ............... H01H 31/10 307/115 |
| 9,871,488 B2 * | 1/2018 | Lin ........................ H03F 1/0205 |
| 10,333,579 B1 * | 6/2019 | Emira et al. ............. H04B 1/44 |
| 10,778,276 B2 * | 9/2020 | Kim et al. ............... H04B 1/40 |
| 11,171,683 B2 | 11/2021 | Elsayed et al. |

(Continued)

FOREIGN PATENT DOCUMENTS

WO    WO 2012/154840    11/2012

OTHER PUBLICATIONS

European Search Report in European Application No. EP22186485.3, mailed Jan. 16, 2023 in 10 pages.

*Primary Examiner* — Curtis A Kuntz
(74) *Attorney, Agent, or Firm* — Knobbe, Martens, Olson & Bear, LLP (57) ABSTRACT

An RF transceiver (100) which has a single RF antenna port (20) for a receive path, and two transmit paths, a balun (10) including a primary winding (11) and a secondary winding (12), the latter coupled to the RF antenna port (20), the receive path including a low noise amplifier (LNA), the first transmit path including a high power amplifier (HPA), switches (S1, S2), and capacitors (C1, C2), the second transmit path including a low power amplifier (LPA) and a switch (S3).

12 Claims, 9 Drawing Sheets

(56) References Cited

U.S. PATENT DOCUMENTS

| | | | |
|---|---|---|---|
| 12,249,966 B2* | 3/2025 | Lo et al. | H03F 3/245 |
| 2017/0093032 A1* | 3/2017 | Khoury et al. | H01Q 1/50 |
| 2021/0111748 A1* | 4/2021 | Elsayed et al. | H04B 1/44 |
| 2023/0049925 A1* | 2/2023 | Lo et al. | H03F 3/245 |

* cited by examiner

RF TRANSCEIVER

RELATED APPLICATIONS

Any and all applications for which a foreign or domestic priority claim is identified in the Application Data Sheet of the present application are hereby incorporated by reference under 37 CFR 1.57.

TECHNICAL DOMAIN

The present disclosure concerns a radio-frequency (RF) transceiver.

RELATED ART

In this context the term "RF" or the expression "radio-frequency" indicates a range of frequencies between 3 kHz and 300 GHz, in particular between 300 MHz and 100 GHz.

RF transceivers are used, in communication devices (e.g., in portable or wearable devices), to perform signal transmission and reception over one or multiple frequency bands according to communication standards, as for example Bluetooth (BT), Bluetooth Low Energy (BLE), WCDMA, CDMA, GSM, LTE standards for cellular telephony, IEEE 802.11 protocols for wireless LAN, etc.

RF transceivers comprise in general a single RF antenna port for a receive path and a transmit path.

The transmit path comprises in general a high power amplifier. In this context, an "high power amplifier" indicates a power amplifier having an output power in the range of +15 dBm+30 dBm.

A high power amplifier can have differential output terminals. In this case, the RF transceiver comprises in general a balun, the balun comprising a primary winding and a secondary winding. In general, the differential output terminals of the high power amplifier are coupled to the primary winding, and the secondary winding is coupled to the RF port.

The receive path comprises in general a low noise amplifier.

High power amplifiers are optimized for high output powers according to the needs. Inevitably, efficiency (i.e. the ratio between the output power and the supplied power) reduces for large backoffs (e.g. for backoffs of 6 dB), in particular when the output power reduces.

In other words, current state-of-the-art high power amplifiers implementations focus on optimizing efficiency over a limited power range, usually within 6 dB backoff.

In the state of the art, there is a need of an improved efficiency not only for maximum output powers in the range from +15 dBm to +30 dBm but also for lower output powers around 0 dBm, e.g. in the range from −5 dBm to +5 dBm.

In the state of the art, there is a need of an improved efficiency for large backoffs as well, for example over a backoff range of 20 dB.

U.S. Pat. No. 11,171,683 discloses a RF transceiver comprising a single RF antenna port for a receive path, a first transmit path and a second transmit path. The described RF transceiver comprises a high power amplifier in the first transmit path, a low power amplifier in the second transmit path and a switch network. The described RF transceiver can work in different operating modes. In a low-power transmit mode (in this document, the BLE transmit mode, such as a +7 dBm mode, is an example of a low-power transmit mode), switches are opened and/or closed so that the second transmit path is used for transmitting (low) power signals. In a high-power transmit mode (in this document, the Bluetooth transmit mode, such as a +13 dBm mode, is an example of a high-power transmit mode) switches are opened and/or closed so that the first transmit path is used for transmitting (high) power signals. In a receive mode, switches are opened and/or closed so that the receive path is used for receiving signals.

SUMMARY

A RF transceiver like the described RF transceiver in U.S. Pat. No. 11,171,683 has some drawbacks. First, the receive path comprises a switch at the output of the low power amplifier, in series with the low power amplifier. This switch is submitted to high stresses, in particular for high voltage and current swings, and can wear out, by damaging the low power amplifier and the low noise amplifier as well. Moreover, it introduces an ohmic resistance in the series path when it is in a closed position, thereby dissipating power which reduces the power amplifier efficiency.

Second, the low noise amplifier is not protected from stress due to power amplifier, as its input is not grounded directly. Therefore, the RF transceiver comprises an additional matching network for protecting the low noise amplifier, thereby increasing the RF transceiver's components' number.

Last, but not least, the switch network is arranged so that, a coupling is created between an operating path, and a not-operating path.

An aim of the present disclosure is the provision of a RF transceiver that overcomes the shortcomings and limitations of the state of the art.

Another aim of the disclosure is the provision of a RF transceiver having an improved efficiency not only for output powers in the range from +15 dBm to +30 dBm, but also for lower output powers around 0 dBm, e.g. in the range from −5 dBm to +5 dBm.

Another aim of the disclosure is the provision of a RF transceiver having an improved efficiency for large backoffs as well, for example over a backoff range of 20 dB.

Another aim of the disclosure is the provision of a RF transceiver minimizing the coupling between the paths, when one of those paths is in use.

Another aim of the disclosure is the provision of a RF transceiver devoid of a switch in series with the output of a power amplifier.

According to the disclosure, these aims are attained by the object of the attached claims, and especially by the RF transceiver according to claim 1.

The RF transceiver according to the disclosure comprises:
- a single RF antenna port for a receive path, a first transmit path and a second transmit path
- a balun comprising a primary winding and a secondary winding, wherein a first terminal of the secondary winding is coupled to the RF antenna port.

In this context, the term "coupled" does not mean necessarily "directly coupled". For example, if one or more components are placed between the secondary winding and the RF antenna port, the secondary winding is still coupled to the RF antenna port, as long as there is a RF signal path between the secondary winding and the RF antenna port.

According to the disclosure, the receive path comprises a low noise amplifier, comprising an input terminal coupled to a second terminal of the secondary winding.

According to the disclosure, the first transmit path comprises:

a high power amplifier, comprising differential output terminals coupled to the primary winding, a first and second switches between each differential output terminal of the high power amplifier and the ground potential or a first differential output terminal of the high power amplifier, a third capacitor between the first switch and the ground potential or between the first switch and a first differential output terminal of the high power amplifier of the high power amplifier, and a fourth capacitor between the second switch and the ground potential or between the second switch and a second differential output terminal of the high power amplifier.

According to the disclosure, the second transmit path, which comprises a low power amplifier having an output terminal coupled to the RF antenna port, and a third switch between the output terminal of the low power amplifier and the ground potential.

According to the disclosure, a "low power amplifier" indicates a power amplifier having an output power around 0 dBm.

According to the disclosure, the RF transceiver is configured to be in:

a high power transmit mode when the first, second and third switches are in a closed position, wherein in the high power transmit mode, the first transmit path is arranged to provide to the RF antenna port a high power RF signal, a low power transmit mode when the first, second, and third switches are in an open position, wherein in the low power transmit mode, the second transmit path is arranged to provide to the RF antenna port a low power RF signal, a receive mode when the first, second, and third switches are in an open position, wherein in the receive mode the receive path is arranged to receive from the RF antenna port a third RF signal.

According to the disclosure, there are not two paths operating at the same time. In other words, according to the disclosure, there is always a single path operating at a time.

The specific arrangement of the RF transceiver according to the disclosure allows to improve its efficiency not only for output powers in the range from +15 dBm to +30 dBm, but also for lower output powers around 0 dBm, e.g. in the range from −5 dBm to +5 dBm.

The specific arrangement of the RF transceiver according to the disclosure allows to improve its efficiency for large backoffs as well, for example over a backoff range of 20 dB.

The RF transceiver according to the disclosure, and in particular the first and second switches between each differential output terminal of the high power amplifier and the ground potential, of a third capacitor between the first switch and the ground potential (or between the first switch and a first differential output terminal of the high power amplifier), and of a fourth capacitor between the second switch and the ground potential (or between the second switch and a second differential output terminal of the high power amplifier), allow to minimize the coupling between not-used path(s) and a currently used path.

Advantageously, the RF transceiver according to the disclosure is devoid of a switch in series with the output of a power amplifier and therefore of all the above-mentioned drawbacks related to this series switch. The RF transceiver according to the disclosure is devoid also of a series switches in the receive path.

Moreover, the specific arrangement of the RF transceiver according to the disclosure can be obtained by starting from an existing RF transceiver comprising only the receive path and the high power transmit path. The low power transmit path can be easily added to this existing RF transceiver, with minimal disruption of both the high power amplifier operation and of the low noise amplifier operation.

In one embodiment, the RF transceiver comprises:
a fourth switch between the second terminal of the secondary winding and the ground potential,
a first matching capacitor between the first terminal of the secondary winding and the output terminal of the low power amplifier, wherein
the first transmit path is configured to provide the first RF signal to the RF antenna port when the fourth switch is in a closed position,
the second transmit path is configured to provide the second RF signal to the RF antenna port when the fourth switch is in a closed position,
the receive path is configured to receive the third RF signal from the RF antenna port when the fourth switch is in an open position.

In one embodiment, the RF transceiver comprises:
a first matching capacitor between the first terminal of the secondary winding and the RF antenna port,
wherein the output terminal of the low power amplifier is coupled to the second terminal of the secondary winding.

In one embodiment, the RF transceiver comprises:
a second matching capacitor, between the input terminal of the low noise amplifier and the second terminal of the secondary winding.

In one embodiment, at least one of the high power amplifier and the low power amplifier is a non-linear class power amplifier.

Power amplifiers of classes D, $D^{-1}$, E, F, $F^{-1}$ are non limitative examples of non-linear class power amplifiers.

In one embodiment at least one of the high power amplifier and the low power amplifier is a class D amplifier.

In one embodiment the high power amplifier is an inverse class D amplifier.

In one embodiment. the low power amplifier is a single-ended low power amplifier.

In one embodiment, at least one of the high power amplifier and the low power amplifier comprises transistors realised with a FDSOI (Fully Depleted Silicon On Insulator) process, the RF transceiver comprising a backgate control module in a final stage of at least one of the high power amplifier and the low power amplifier, for controlling a backgate voltage of the transistors. This embodiment is a possible optimization of the RF transceiver according to the disclosure.

In one embodiment, at least one of the high power amplifier and the low power amplifier comprises a DC-DC converter module, for controlling, e.g. for lowering, a DC power supply of a final stage of at least one of the high power amplifier and the low power amplifier. This embodiment is another optimization of the RF transceiver according to the disclosure.

In one embodiment, at least one of the high power amplifier and the low power amplifier comprises a duty cycle control module, for controlling a duty cycle of a phase path in a final stage of at least one of the high power amplifier and the low power amplifier. This embodiment is another optimization of the RF transceiver according to the disclosure.

In one embodiment, the RF transceiver comprises a module for driving only a part of the high power amplifier, in order to optimize the efficiency of the RF transceiver. This embodiment is another optimization of the RF transceiver according to the disclosure.

BRIEF DESCRIPTION OF THE DRAWINGS

Exemplar embodiments of the disclosure are disclosed in the description and illustrated by the drawings in which.

DETAILED DESCRIPTION

Figure 1A:
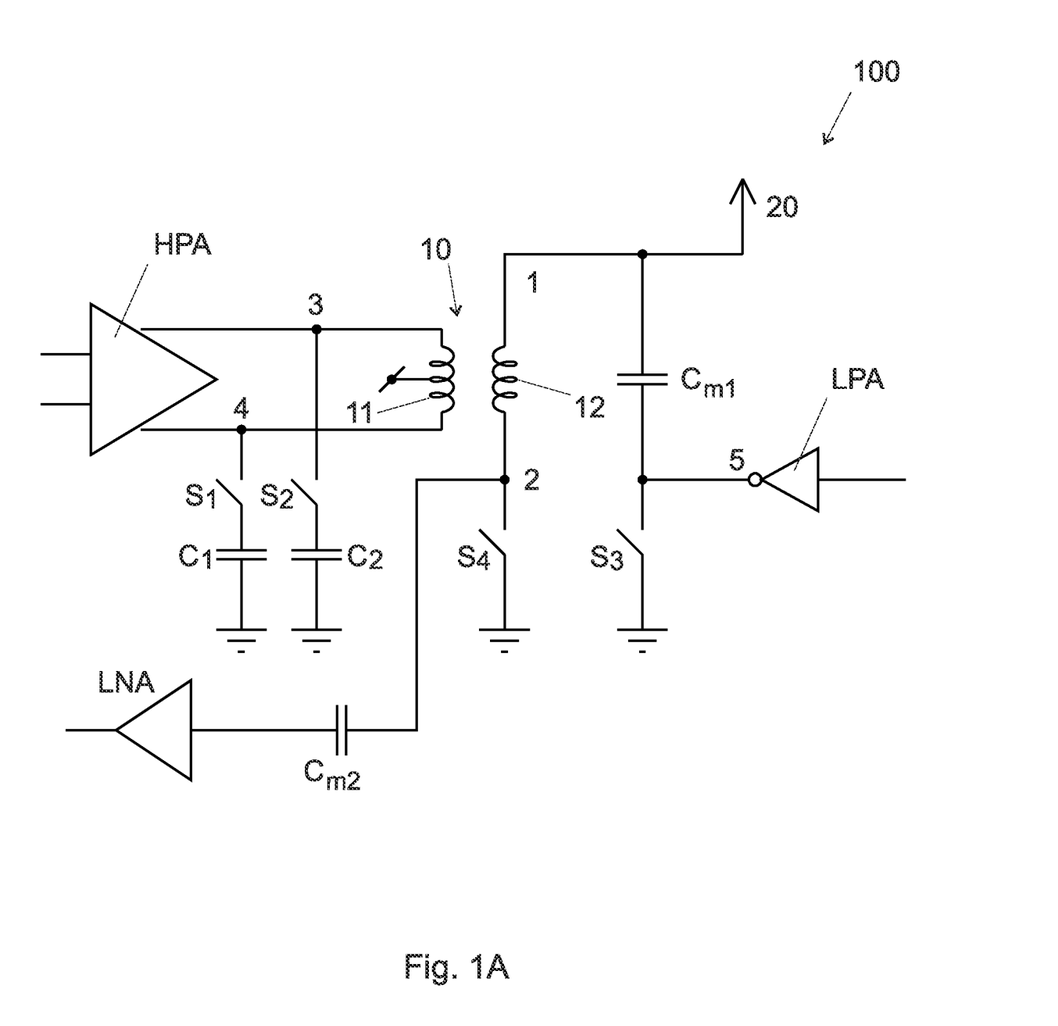
FIG. 1A illustrates schematically a RF transceiver according to one embodiment of the disclosure.

FIG. 1A illustrates schematically a RF transceiver 100 according to one embodiment of the disclosure.

The RF transceiver 100 of FIG. 1A comprises a single RF antenna port 20 for a receive path, a first transmit path and a second transmit path, and a balun 10 comprising a primary winding 11 and a secondary winding 12, wherein a first terminal 1 of the secondary winding 12 is coupled to the RF antenna port 20.

In particular, the receive path of the RF transceiver 100 of FIG. 1A comprises the RF antenna port 20, the secondary winding 12 of the balun 10, a second matching capacitor Cm2, between the input terminal of the low noise amplifier LNA and the second terminal 2 of the secondary winding 12.

The first transmit path of the RF transceiver 100 of FIG. 1A is arranged to transmit high power. It comprises:
- a high power amplifier HPA, comprising differential output terminals 3, 4 coupled to the primary winding 11 of the balun 10,
- a first and second switches S1 respectively S2 between each differential output terminal 3, 4 of the high power amplifier HPA and the ground potential,
- a capacitor C1 between the first switch S1 and the ground potential, and
- another capacitor C2 between the second switch S2 and the ground potential.

The second transmit path of the RF transceiver 100 of FIG. 1A is arranged to transmit low power. It comprises:
- a low power amplifier LPA having an output terminal 5 coupled to the RF antenna port 20 via a first matching capacitor Cm1, and
- a third switch S3 between the output terminal 5 of the low power amplifier LPA and the ground potential.

Although the low power amplifier LPA illustrated in FIG. 1A has a single-ended output, it could have also a differential output. In this case, an additional balun could be required to couple the RF signal to the balun 10.

Although the low power amplifier LPA illustrated in FIG. 1A is an inverter, this embodiment should not be considered as limitative and other types of low power amplifier LPA could be used. Moreover, also an array of inverters with individual enabling capability could be used instead of a single inverter, in order to provide RF power control.

The RF transceiver 100 of FIG. 1A comprises also a third switch S3 between the output terminal 5 of the low power amplifier LPA and the ground potential, and a fourth switch S4 between the second terminal 2 of the balun 10 and the ground potential.

In the embodiment of FIG. 1A, the second transmit path feeds the antenna port 20 via the first matching capacitor Cm1, thereby bypassing the first transmit path.

In the embodiment of FIG. 1A, all switches S1 to S4 are closed during the operation of the first transmit path. All switches S1 to S4 are open during the operation of the receive path. Only switch S4 is closed during the operation of the second transmit path, the other switches S1 to S3 being open.

In the embodiment of FIG. 1A, first and second transmit paths exhibit high output impedance when not in use, which is minimally loading and therefore not interfering with the operating transmit path.

In the embodiment of FIG. 1A, duty-cycling and/or slicing techniques can be used for the power amplifier of the first and/or second transmit path(s).

In the embodiment of FIG. 1A, the second matching capacitor Cm2 facilitates the matching of the low noise amplifier LNA.

The specific arrangement of the RF transceiver according to the disclosure allows to improve its efficiency not only for output powers in the range from +15 dBm to +30 dBm, but also for lower output powers around 0 dBm, e.g. in the range from −5 dBm to +5 dBm.

The specific arrangement of the RF transceiver according to the disclosure allows to improve its efficiency for large backoffs as well, for example over a backoff range of 20 dB.

The RF transceiver according to the disclosure, and in particular the first and second switches S1, S2 between each differential output terminal of the high power amplifier and the ground potential, of a third capacitor C1 between the first switch S1 and the ground potential, and of a fourth capacitor C2 between the second switch S2 and the ground potential, allow to minimize the coupling between not-used path(s) and a currently used path.

Advantageously, the RF transceiver according to the disclosure is devoid of a switch in series with the output of a power amplifier and therefore of all the above-mentioned drawbacks related to this series switch.

Moreover, the specific arrangement of the RF transceiver according to the disclosure can be obtained by starting from an existing RF transceiver comprising only the receive path and the high power transmit path. The low power transmit path can be easily added to this existing RF transceiver, with minimal disruption of both the high power amplifier operation and of the low noise amplifier operation.

Simulations performed by the applicants show that, in comparison to the same RF transceiver 100 of FIG. 1A devoid of the second transmit path, the RF transceiver 100 of FIG. 1A has an improved efficiency and reduce current drain. For example, for 0 dBm output power only 3.7 mA is dissipated instead of 10 mA, while for 4 dBm output the dissipation is 6 mA instead of 17 mA. The efficiency thus improves to 27% and 47% from 10% and 15% respectively.

Figure 1B:
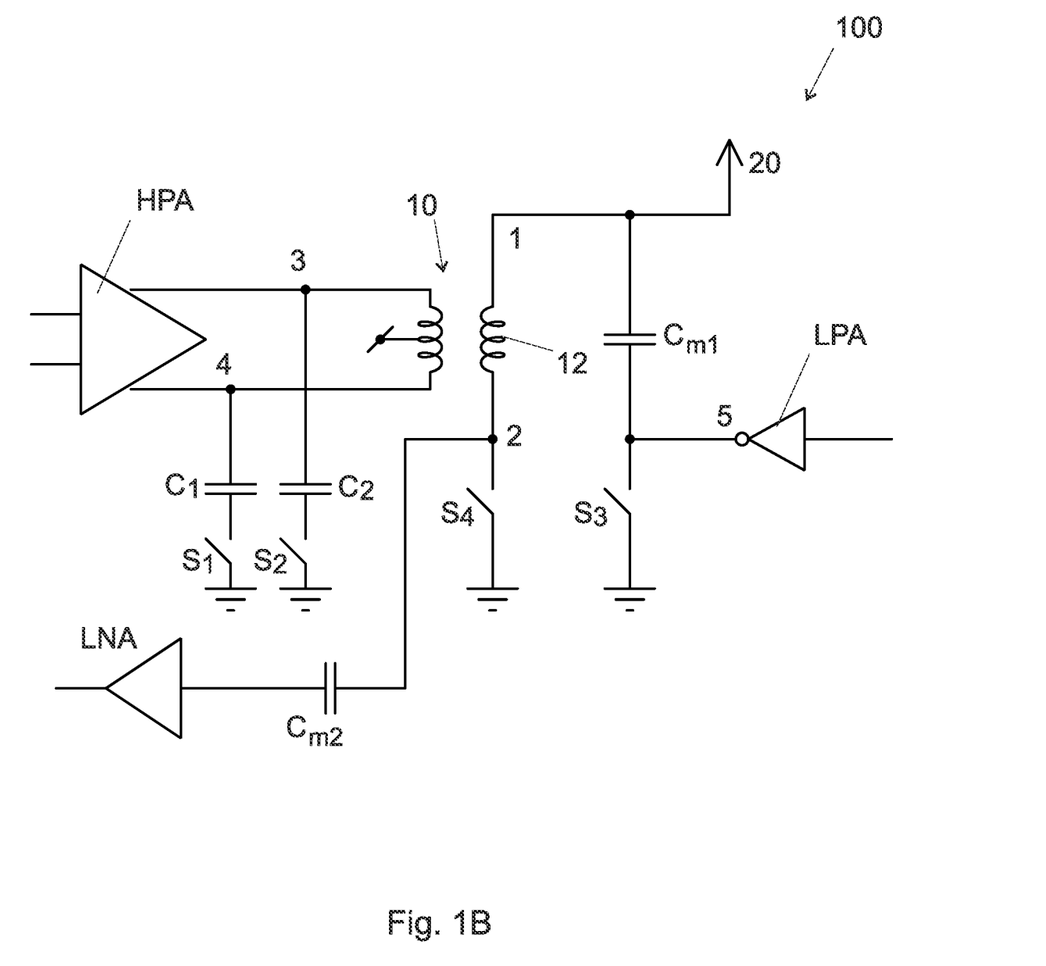
FIG. 1B illustrates schematically a RF transceiver according to another embodiment of the disclosure.

FIG. 1B illustrates schematically a RF transceiver according to another embodiment of the disclosure. This embodiment is different from the one of FIG. 1A in that, the third capacitor C1 is between the first switch S1 and the differential output terminal 4 of the high power amplifier HPA, and the fourth capacitor C2 is between the second switch S2 and differential output terminal 3 of the high power amplifier HPA.

Figure 2A:
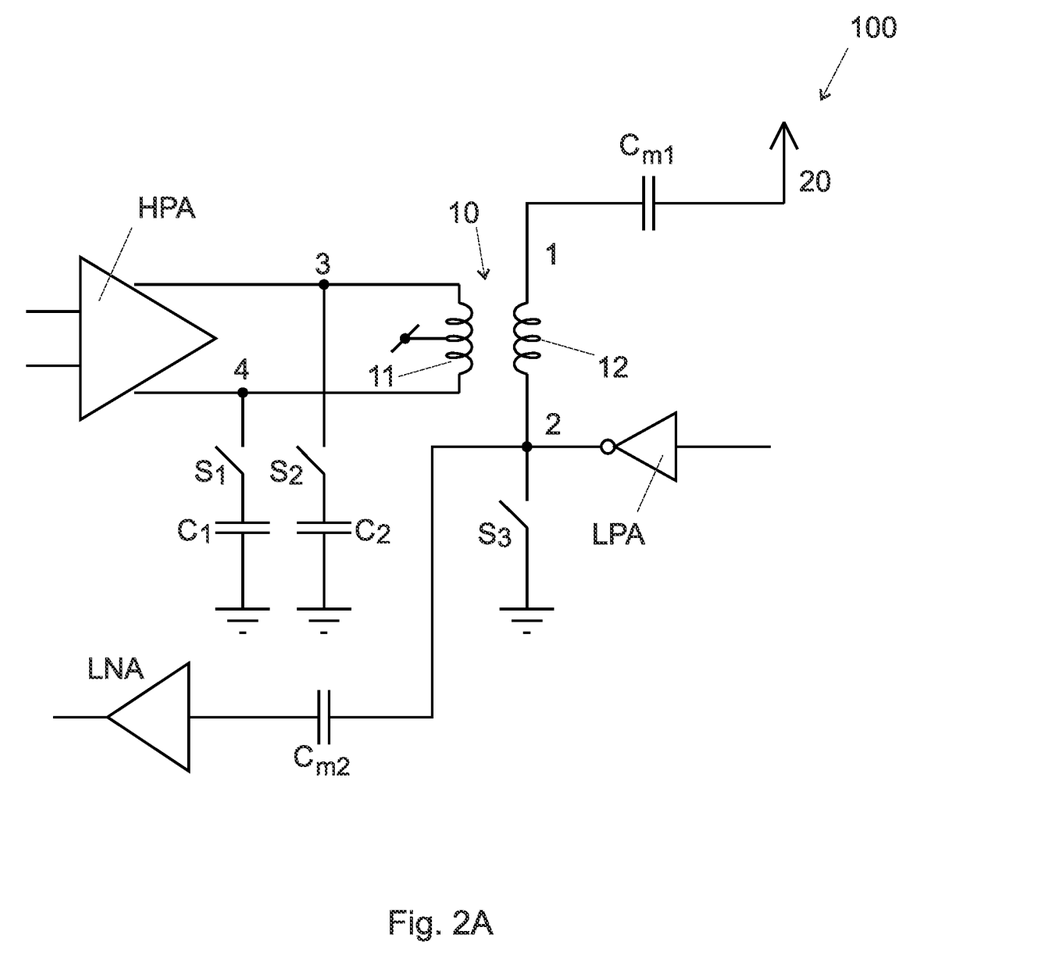
FIG. 2A illustrates schematically a RF transceiver according to another embodiment of the disclosure.

FIG. 2A illustrates schematically a RF transceiver 100 according to another embodiment of the disclosure.

The RF transceiver 100 of FIG. 2A comprises a single RF antenna port 20 for a receive path, a first transmit path and a second transmit path, and a balun 10 comprising a primary winding 11 and a secondary winding 12, wherein a first terminal 1 of the secondary winding 12 is coupled to the RF antenna port 20.

In particular, the receive path of the RF transceiver 100 of FIG. 2A comprises the RF antenna port 20, the secondary winding 12 of the balun 10, a second matching capacitor Cm2, between the input terminal of the low noise amplifier LNA and the second terminal 2 of the secondary winding 12.

The first transmit path of the RF transceiver 100 of FIG. 2A is arranged to transmit high power. It comprises:
- a high power amplifier HPA, comprising differential output terminals 3, 4 coupled to the primary winding 11 of the balun 10,
- a first and second switches S1 respectively S2 between each differential output terminal 3, 4 of the high power amplifier HPA and the ground potential,
- a capacitor C1 between the first switch S1 and the ground potential, and
- another capacitor C2 between the second switch S2 and the ground potential.

The second transmit path of the RF transceiver 100 of FIG. 2A is arranged to transmit low power. It comprises:
- a low power amplifier LPA having an output terminal which corresponds to the second terminal 2 of the second winding of the balun 10, coupled to the RF antenna port 20 via a first matching capacitor Cm1, and
- a third switch S3 between the output terminal 2 of the low power amplifier LPA and the ground potential.

Again, although the low power amplifier LPA illustrated in FIG. 2A has a single-ended output, it could have also a differential output. In this case, an additional balun could be required.

Again, although the low power amplifier LPA illustrated in FIG. 2A is an inverter, this embodiment should not be considered as limitative and other types of low power amplifier LPA could be used. Moreover, also an array of inverters could be used instead of a single inverter, to allow for RF power control.

The RF transceiver 100 of FIG. 2A is devoid of the fourth switch S4 of the embodiment of FIG. 1A.

In the embodiment of FIG. 2A, the second transmit path feeds the antenna port 20 at the bottom of the secondary winding 12 of the balun 10, in parallel to the low noise amplifier LNA input.

In the embodiment of FIG. 2A, all switches S1 to S3 are closed during the operation of the first transmit path. All switches S1 to S3 are open during the operation of the receive path. All switches S1 to S3 are open also during the operation of the second transmit path.

In the embodiment of FIG. 2A, first and second transmit paths exhibit high output impedance when not in use, which is minimally loading and therefore not interfering with the operating transmit path.

In the embodiment of FIG. 2A as well, duty-cycling and/or slicing techniques can be used for the power amplifier of the first and/or second transmit path(s).

In the embodiment of FIG. 2A, the matching capacitors Cm1 and Cm2 facilitate the matching of the low noise amplifier LNA. The matching capacitor Cm1 facilitates also the matching of the power amplifier LPA.

Figure 2B:
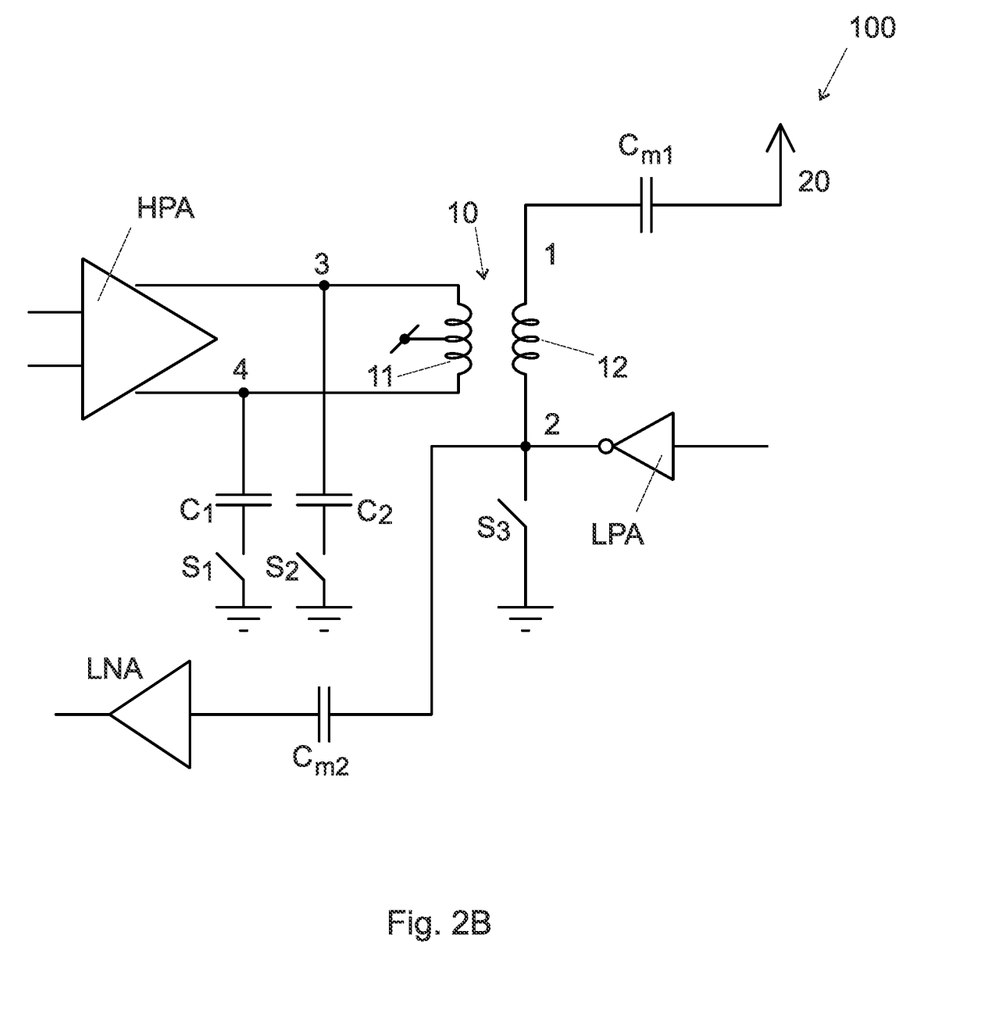
FIG. 2B illustrates schematically a RF transceiver according to another embodiment of the disclosure.

FIG. 2B illustrates schematically a RF transceiver according to another embodiment of the disclosure. This embodiment is different from the one of FIG. 2A in that, the third capacitor C1 is between the first switch S1 and the differential output terminal 4 of the high power amplifier HPA, and the fourth capacitor C2 is between the second switch S2 and the differential output terminal 3 of the high power amplifier HPA.

In one preferred embodiment, which can be combined e.g. with one of the embodiments of FIG. 1A, 1B, 2A or 2B, at least one of the high power amplifier HPA and the low power amplifier LPA is a non-linear class power amplifier.

Power amplifiers of classes D, $D^{-1}$, E, F, $F^{-1}$ are non limitative examples of non-linear class power amplifiers.

In one preferred embodiment, which can be combined e.g. with one of the embodiments of FIG. 1A, 1B, 2A or 2B, at least one of the high power amplifier HPA and the low power amplifier LPA is a class D amplifier.

In one preferred embodiment, which can be combined e.g. with one of the embodiments of FIG. 1A, 1B, 2A or 2B, the high power amplifier HPA is an inverse class D amplifier.

Figure 3:
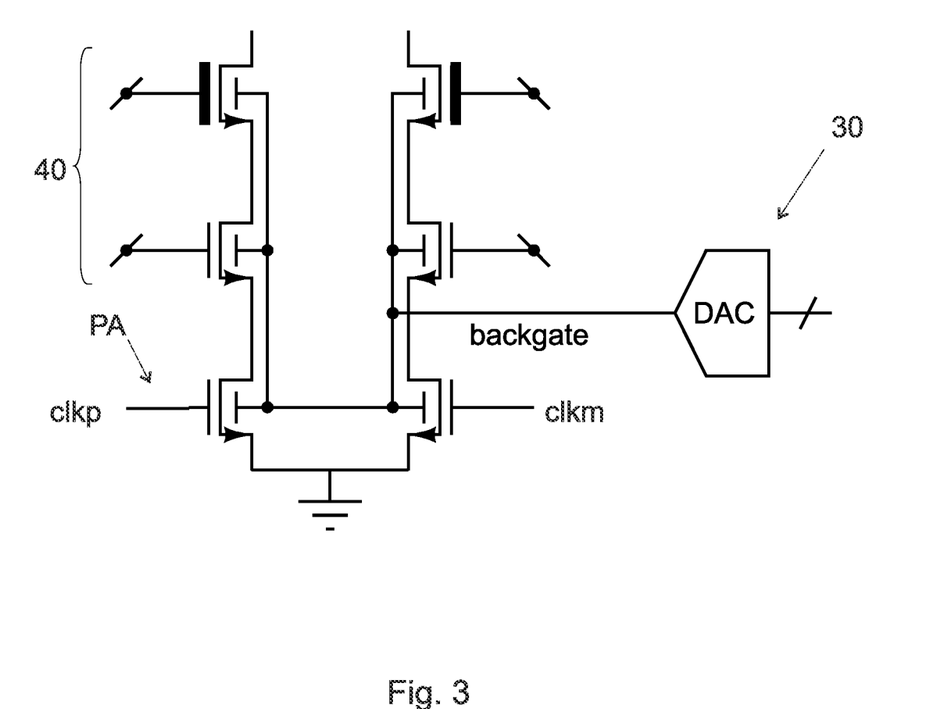
FIG. 3 illustrates schematically a portion of a RF transceiver according to another embodiment of the disclosure.

FIG. 3 illustrates schematically a portion of a RF transceiver according to another embodiment of the disclosure. In this embodiment, at least one of the high power amplifier and the low power amplifier PA comprises transistors realised with a FDSOI process, the RF transceiver comprising a backgate control module 30 in (a final stage of) at least one of the high power amplifier and the low power amplifier PA, for controlling a backgate voltage of the transistors.

This embodiment is a possible optimization of the RF transceiver 100 according to the disclosure, allowing to optimize efficiency for small backoffs, e.g. for backoff up to 3 dB. It applies in particular for non-linear power amplifier PA. In fact, high backgate voltage, i.e. backgate voltages up to 2 Volts, makes the transistors of the PA less resistive.

In the embodiment illustrated in FIG. 3, the backgate control module 30 comprises a digital to analog converter DAC.

In the embodiment illustrated in FIG. 3, the (low or high) power amplifier PA comprises a cascode 40, which is not essential for this embodiment.

Although in the embodiment of FIG. 3, the (low or high) power amplifier PA comprises a differential clock (or phase) input, this is not essential for this embodiment, which applies also to power amplifiers having a single-ended inputs and/or a differential input different from a differential phase input.

Figure 4A:
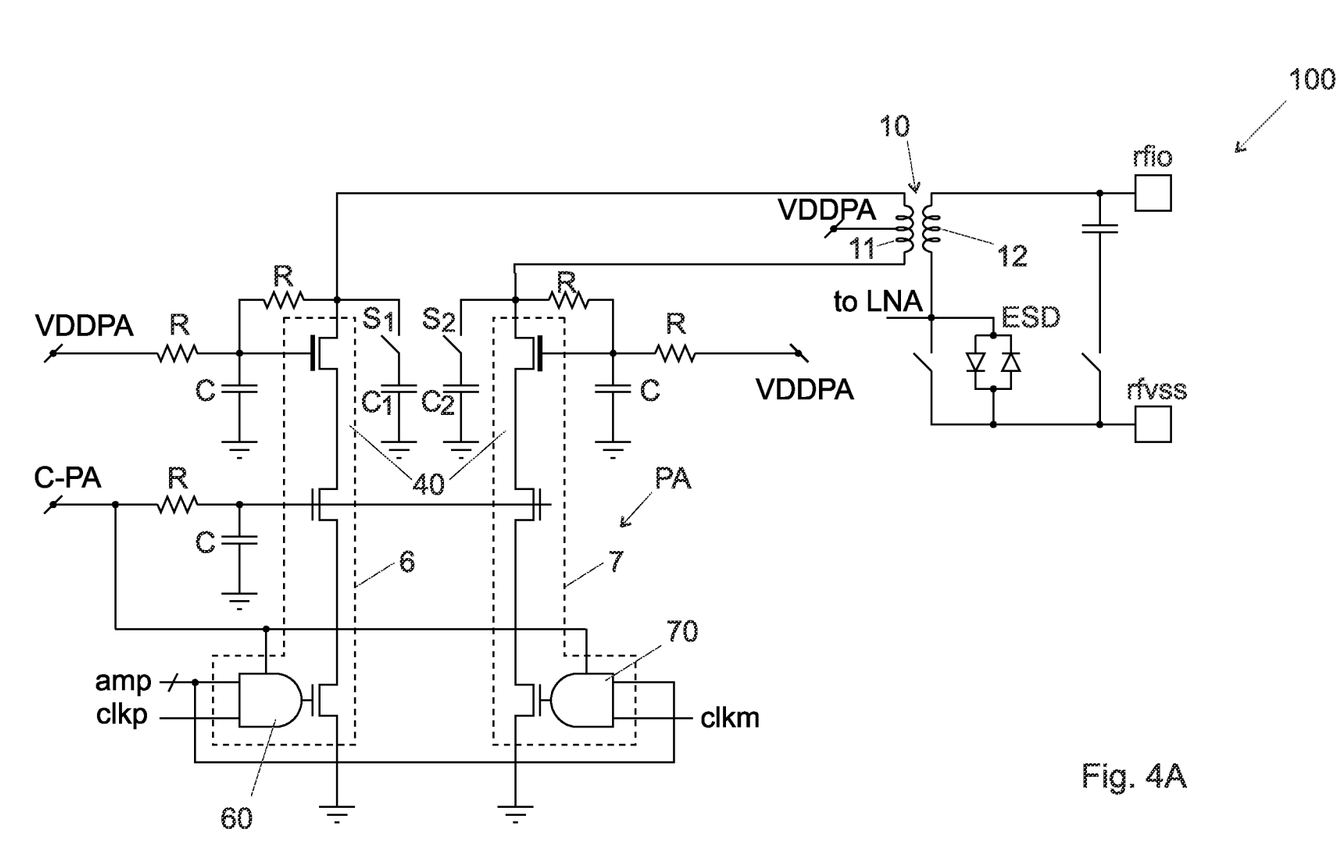
FIG. 4A illustrates schematically a RF transceiver according to another embodiment of the disclosure.

FIG. 4A illustrates schematically a RF transceiver 100 according to another embodiment of the disclosure. This embodiment comprises possible optimizations of the RF transceiver 100 according to the disclosure. It applies for all (linear or non-linear) (high and/or low) power amplifiers PA.

The (low or high) power amplifier PA illustrated in FIG. 4A comprises a differential (clock) input and two main branches 6, 7, one for each input clkp and clkm. In one preferred embodiment, each of the branches 6, 7 comprises several (for example and in a non-limiting way 256) slices in parallel that can be individually enabled by a multi-bit amp signal via the AND modules 60 respectively 70, in order to control the RF power. The (low or high) power amplifier PA illustrated in FIG. 4A comprises also an input of amplitude data amp, at the AND module 60 respectively 70.

Although in the embodiment of FIG. 4A, the (low or high) power amplifier PA comprises a differential phase input and an amplitude data input, this is not essential for this embodiment, which applies also to power amplifiers having a single-ended inputs, a differential input different from a differential phase input and/or devoid of an amplitude data input.

Although in the embodiment of FIG. 4A the (low or high) power amplifier PA comprises a cascodes 40 (supplied with the C-PA and VDDPA supply voltages), again this is not essential for this embodiment The power amplifier PA is supplied with the voltage VDDPA.

The illustrated capacitors C and resistors R allow to bias the power amplifier PA. Their arrangement should not be considered as limitative.

The presence of the electrostatic discharge protection ESD should not be considered as well as limitative.

In one embodiment, the peak value (p) of 1st harmonic (1) of the load voltage VL across the second winding 12 of the balun 10, named VL1p, is given by the formula:

$$V_{L1p} \approx 2\frac{\tau}{T}\mathrm{sinc}\left(\frac{\tau}{T}\right)V_{DD}\sqrt{\frac{L_2}{L_2}}\left[1+\frac{\tau}{T}\pi\frac{R_L}{\omega_o L_2}\mathrm{coth}\left(\frac{T-\tau}{T}\pi\frac{R_L}{\omega_o L_2}\right)\right]$$

wherein
τ is the RF signal duty-cycle
T is the RF signal period
VDD is the PA supply voltage VDDPA
L1 is the inductance of the first winding 11 of the balun 10
L2 is the inductance of the second winding 12 of the balun 10
RL is the resistance of the load
ω0 is the RF frequency signal in rad/s The power PL on the load can be then written according to the following formula:

$$P_L \approx \frac{(2\cdot V_{L1p}/\sqrt{2})^2}{R_L}$$

The combination of the two formulas here above shows that, it is possible to control the output power of the (low or high) power amplifier PA by modifying the PA supply voltage VDD, for example with a DC-DC converter.

For example, the DC power supply of the final stage of a power amplifier PA may be lowered. For example, halving the power supply results in 10 dB backoff and 15% efficiency loss. Efficiency reduces as the balun 10 is inevitably optimized for the maximum power.

In complement or in alternative, the combination of the two formulas here above shows that, it is possible to control the output power of the (low or high) power amplifier PA also by modifying on the RF signal duty-cycle τ.

Duty-cycle control in the phase path(s) clkp and/or clkm can therefore be used. For example, reducing the power by 6 dB (by narrowing the pulses, e.g. in the final stage) results in 10% efficiency reduction at constant supply.

Duty-cycle control can be used instead of the DC power supply control or simultaneously with it, depending on the application.

Figure 4B:
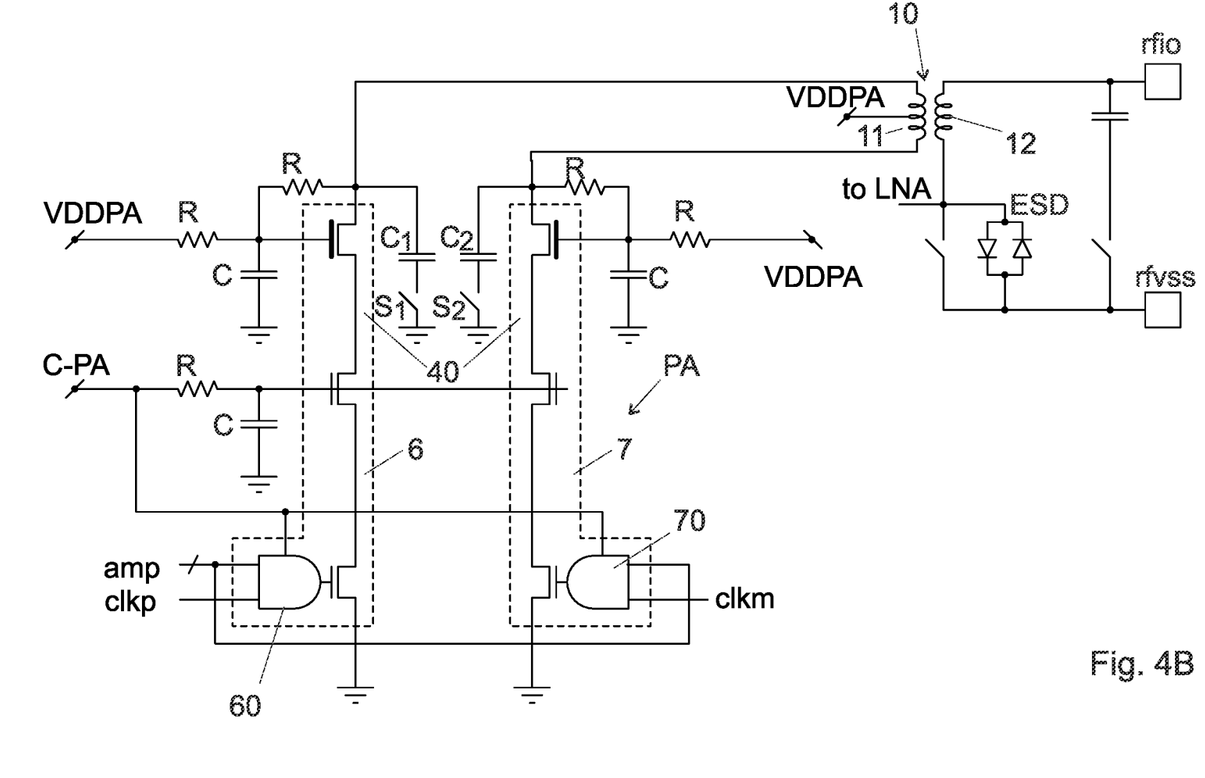
FIG. 4B illustrates schematically a RF transceiver according to another embodiment of the disclosure.

FIG. 4B illustrates schematically a RF transceiver according to another embodiment of the disclosure. This embodiment is different from the one of FIG. 4A in that, the third capacitor C1 is between the first switch S1 and a first differential output terminal of the high power amplifier HPA, and the fourth capacitor C2 is between the second switch S2 and a second differential output terminal of the high power amplifier HPA.

Figure 5:
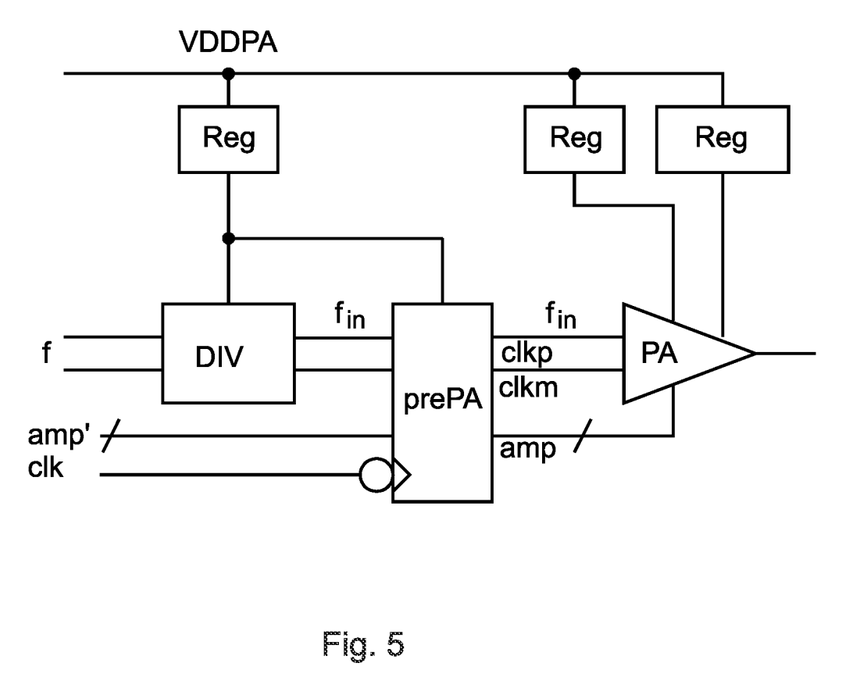
FIG. 5 illustrates schematically a portion of a RF transceiver according to another embodiment of the disclosure.

FIG. 5 illustrates schematically a portion of a RF transceiver according to another embodiment of the disclosure. It shows the use of duty-cycle control and of the DC power supply control for efficiency optimization during backoff.

In particular, the external power supply VDDPA is controlled by a DC-DC converter, via one or more voltage regulators Reg, allowing to control also the cascode supply voltage, if a cascode is present.

A frequency f (e.g. f=5 GHz) can be divided by a frequency divider DIV for generating an input frequency fin (e.g. fin=2.5 GHz) for a pre-power amplifier module prePA. The pre-power amplifier module prePA of FIG. 5 receives also amplitude data amp' and a clock signal (having a clock frequency e.g. of 400 MHz). The pre-power amplifier module prePA allows to control the duty cycle of the phase differential input clkp and clkm for the (low or high) power amplifier PA.

Figure 6:
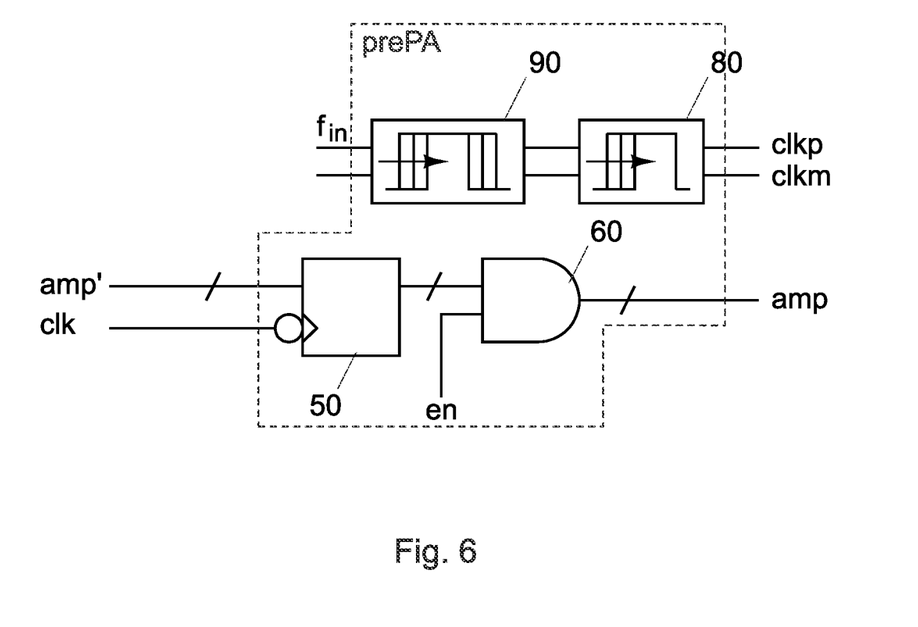
FIG. 6 illustrates schematically a pre-power amplifier module prePA according to another embodiment of the disclosure.

FIG. 6 illustrates schematically a pre-power amplifier module prePA according to another embodiment of the disclosure. It comprises a duty cycle control module 80, for controlling a duty cycle of a phase path in a final stage of at least one of the high power amplifier and the low power amplifier. This embodiment is another optimization of the RF transceiver according to the disclosure.

The pre-power amplifier module prePA of FIG. 6 comprises also a delay module 90, for controlling the clock phase and/or minimize pulling of the integrated oscillator, which synthesizes the transmitted RF signal.

The pre-power amplifier module prePA of FIG. 6 comprises also data flip-flop 50 receiving amplitude data amp' and a clock signal clk and generating an output signal for an AND module 60, enabled by an enabling signal en.

In one embodiment (not illustrated), the RF transceiver 100 comprises a module for driving only a part of the high power amplifier, in order to optimize the efficiency of the RF transceiver. This embodiment is another optimization of the overall efficiency of the RF transceiver according to the disclosure.

REFERENCE SIGNS USED IN THE FIGURES

1 First terminal of the secondary winding of the balun
2 Second terminal of the secondary winding of the balun
3 First terminal of the high power amplifier
4 Second terminal of the high power amplifier
5 Output terminal of the low power amplifier
10 Balun
11 First winding of the balun
12 Second winding of the balun
20 Antenna port
30 Backgate control module
40 Cascode
50 Data flip-flop
60 AND module
70 AND module
80 Duty cycle control module
90 Delay module
100 RF transceiver
amp, amp' Amplitude data C Capacitor
C1 Capacitor
C2 Capacitor
Clk Clock
Clkm Clock minus
Clkp Clock plus
Cm1 First matching capacitor
Cm2 Second matching capacitor
C-PA Cascode supply voltage
en Enabling signal
ESD Electrostatic discharge protection
DIV Frequency divider
f Frequency
fin Input frequency
HPA High power amplifier
LNA Low noise amplifier
LPA Low power amplifier
PA (Low or high) power amplifier
PrePA Pre-power amplifier module
R Resistor
Reg Voltage regulator
Rfio RF input-output
RFvss RF supply voltage
VDDPA PA supply voltage

The invention claimed is:

1. A RF transceiver comprising:
a single RF antenna port for a receive path, a first transmit path and a second transmit path
a balun comprising a primary winding and a secondary winding, wherein a first terminal of the secondary winding is coupled to the RF antenna port,
the receive path, which comprises
a low noise amplifier, comprising an input terminal coupled to a second terminal of the secondary winding,
the first transmit path, which comprises
a high power amplifier, comprising differential output terminals coupled to the primary winding, and
a first and second switches between each differential output terminal of the high power amplifier and a ground potential,
a third capacitor between the first switch and the ground potential or between the first switch and a first differential output terminal of the high power amplifier,
a fourth capacitor between the second switch and the ground potential or between the second switch and a second differential output terminal of the high power amplifier,
the second transmit path, which comprises
a low power amplifier having an output terminal coupled to the RF antenna port, and
a third switch between the output terminal of the low power amplifier and the ground potential,
wherein the RF transceiver is configured to be in
a high power transmit mode when the first, second and third switches are in a closed position, wherein in the high power transmit mode the first transmit path is arranged to provide to the RF antenna port a high power RF signal,
a low power transmit mode when the first, second and third switches are in an open position, wherein in the low power transmit mode the second transmit path is arranged to provide to the RF antenna port a low power RF signal,
a receive mode when the first, second and third switches are in an open position, wherein in the receive mode the receive path is arranged to receive from the RF antenna port a third RF signal.

2. The RF transceiver of claim 1, comprising
a fourth switch between the second terminal of the secondary winding and the ground potential,
a first matching capacitor between the first terminal of the secondary winding and the output terminal of the low power amplifier,
wherein
the first transmit path is configured to provide the first RF signal to the RF antenna port when the fourth switch is in a closed position,
the second transmit path is configured to provide the second RF signal to the RF antenna port when the fourth switch is in a closed position,
the receive path is configured to receive the third RF signal from the RF antenna port when the fourth switch is in an open position.

3. The RF transceiver of claim 1, comprising
a first matching capacitor between the first terminal of the secondary winding and the RF antenna port,
wherein the output terminal of the low power amplifier is coupled to the second terminal of the secondary winding.

4. The RF transceiver of claim 1, comprising
a second matching capacitor, between the input terminal of the low noise amplifier and the second terminal of the secondary winding.

5. The RF transceiver of claim 1, wherein at least one of the high power amplifier and the low power amplifier is a non-linear class power amplifier.

6. The RF transceiver of claim 5, wherein at least one of the high power amplifier and the low power amplifier is a class D amplifier.

7. The RF transceiver of claim 6, wherein the high power amplifier is an inverse class D amplifier.

8. The RF transceiver of claim 1, wherein the low power amplifier is a single-ended low power amplifier.

9. The RF transceiver of claim 5, wherein at least one of the high power amplifier and the low power amplifier comprises transistors realised with a FDSOI process, the RF transceiver comprising a backgate control module in a final stage of said at least one of the high power amplifier and the low power amplifier, for controlling a backgate voltage of said transistors.

10. The RF transceiver of claim 1, wherein at least one of the high power amplifier and the low power amplifier comprises a DC-DC converter module, for controlling, a DC power supply of a final stage of said at least one of the high power amplifier and the low power amplifier.

11. The RF transceiver of claim 1, wherein at least one of the high power amplifier and the low power amplifier comprises a duty cycle control module, for controlling a duty cycle of a phase path in a final stage of said at least one of the high power amplifier and the low power amplifier.

12. The RF transceiver of claim 1, comprising a module for driving only a part of the high power amplifier, in order to optimize the efficiency of the RF transceiver.

* * * * *